United States Patent
Dellett

[15] 3,663,740
[45] May 16, 1972

[54] CABLE SPLICE CASE

[72] Inventor: Harold W. Dellett, P.O. Box 565, Escondido, Calif. 92025

[22] Filed: July 15, 1970

[21] Appl. No.: 55,143

[52] U.S. Cl. .................................. 174/92, 174/77 R, 174/78, 277/189
[51] Int. Cl. ........................................................ H02g 15/08
[58] Field of Search ............................ 174/91–93, 88, 174/78, 77, 17 CT; 277/10, 181, 186, 189

[56] References Cited

UNITED STATES PATENTS

| | | | |
|---|---|---|---|
| 2,788,385 | 4/1957 | Doering et al. | 174/92 |
| 2,945,715 | 7/1960 | Burrell | 277/10 |
| 3,271,505 | 6/1966 | Dellett et al. | 174/92 X |

FOREIGN PATENTS OR APPLICATIONS 245,511    6/1963    Australia ............................. 277/189

*Primary Examiner*—Darrell L. Clay
*Attorney*—Lyon & Lyon

[57] ABSTRACT

A splice case for use on several different types of sheathed or armored multi-conductor telephone and utility cables having the ability of accommodating both double and single sheath cables, on either pressurized or non-pressurized lines for use in buried, conduit or aerial applications. The case includes grippers for securely anchoring the sheaths of the cables to the case to prevent tension loads from damaging the splice, and unique sealing collars for maintaining the moisture-proof integrity of the case when unpressurized and for maintaining positive pressure on pressurized cable systems.

8 Claims, 7 Drawing Figures

Patented May 16, 1972

INVENTOR.
HAROLD W. DELLETT
BY
Lyon Hyon
ATTORNEYS

Patented May 16, 1972

INVENTOR.
HAROLD W. DELLETT
BY
Lyon & Lyon
ATTORNEYS

CABLE SPLICE CASE

BACKGROUND OF THE INVENTION

There is wide spread use of multiple conductor electrical cables for various uses, primarily communications, wherein the cables are provided with an encircling metallic jacket sheilding, which may be for electrical or physical protection, or both. Some such cables contain one sheath and others contain two. The sheath protects the cable so that it may be buried in the ground and also prohibits the entry of moisture into the interior of the cable. To further prevent the entrance of contaminants into the interior of the cable, some such cables are pressurized with 8 to 10 pounds of air pressure. The cable comes in various diameters depending upon the number and size of the conductors contained therein and commonly the diameters vary from ½ to 3 inches. As a result, the length of cables which can be placed on a single storage reel will vary from 1,500 feet up to about 6,000 feet. Thus, a considerable number of splices must be made in these cables and it is mandatory that the splices be protected so that contaminants do not enter the cable sheaths at the splices. It is also necessary to protect the splices so that tension loads applied to the cable will not affect the electrical connections within the case. Furthermore, for those cables which are pressurized, it is desirable that the case not only contain the pressure applied in the line but also transmit it along to the next length of cable. Finally, it is often desirable to split a cable into two or more branches and thus a case must have provision for more than one outlet or inlet.

Various types of cable splice cases have been developed for accomplishing these purposes, but there are certain features of these cases which are not satisfactory. Primarily, the previously designed cases are made to accommodate one particular type of cable whereas there are many types, and thus it is necessary to design several different cases to apply to each type. In addition, in many of the conventional cases the actual splice is often enclosed in epoxy or the like in order to obtain mechanical strength with the result that the splice cannot be inspected or changed in the future.

SUMMARY OF THE INVENTION

Accordingly, it is the principle object of this invention to provide a cable splice case which can accommodate various types of cables thereby permitting splices to be made on such cables without maintaining a large inventory of different kinds of parts.

It is a further object of this invention to provide a splice case which consists of a relatively few number of parts while still obtaining high mechanical strength to withstand externally applied forces.

It is also an object of this invention to provide a splice case which can transmit cable line pressure from one cable length to another. It is another object of this invention to provide a cable splice which is split in half so that the splice can be inspected, repaired or altered, or in which a damaged case can be replaced.

It is also an object of this invention to provide splice cases wherein the splice could be changed from a single branch to multiple branches with a minimum of changes in the splice case assembly. Other objects and advantages of this invention will be immediately apparent to those skilled in the art.

DESCRIPTION OF THE INVENTION

Figure 1:
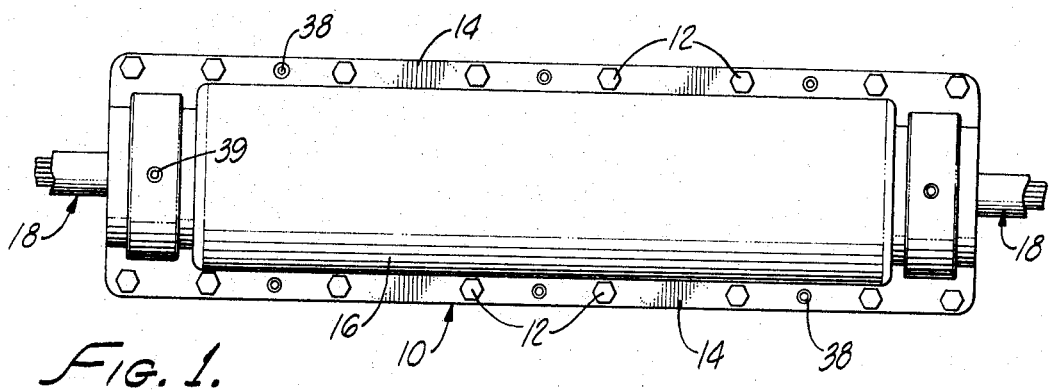
FIG. 1 is a plan view of a completed and closed splice case for a single sheath cable, one in — one out.
Figure 2:
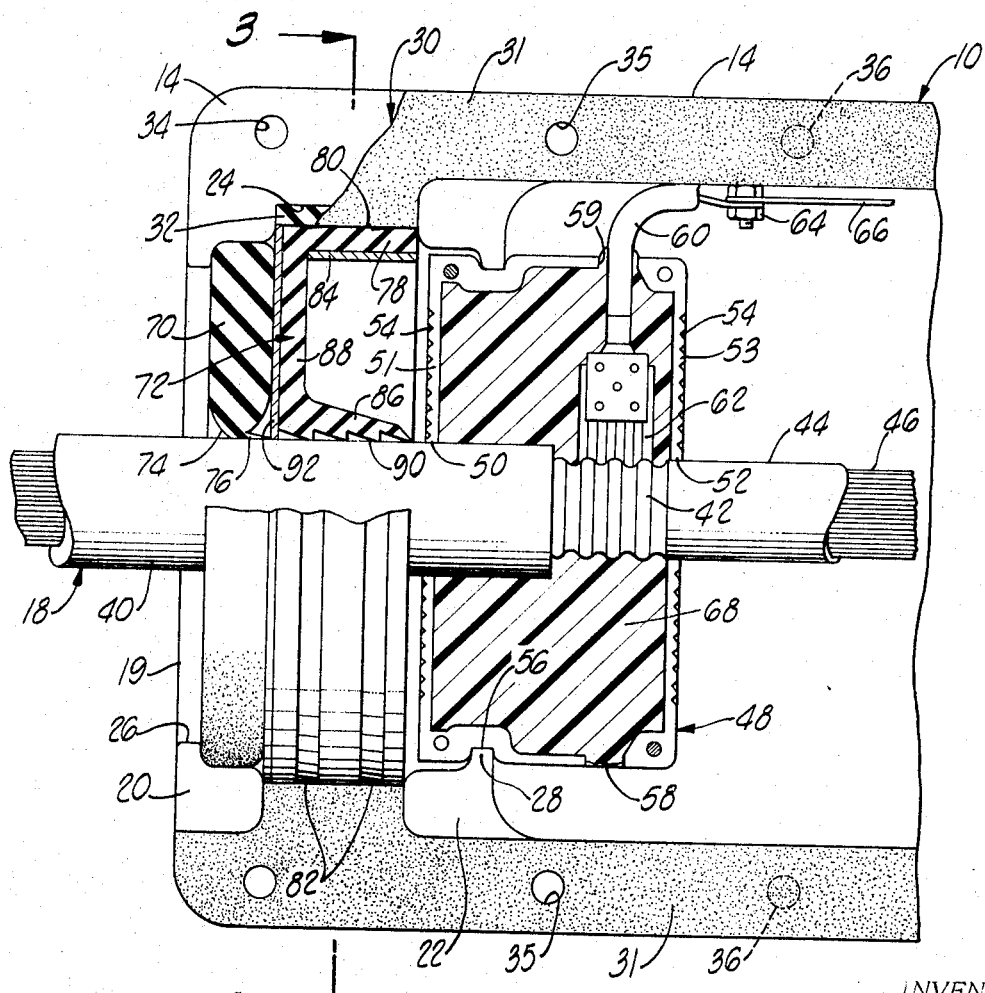
FIG. 2 is an enlarged partial sectional view of the same assembly as shown in FIG. 1 with one-half the case removed.
Figure 3:
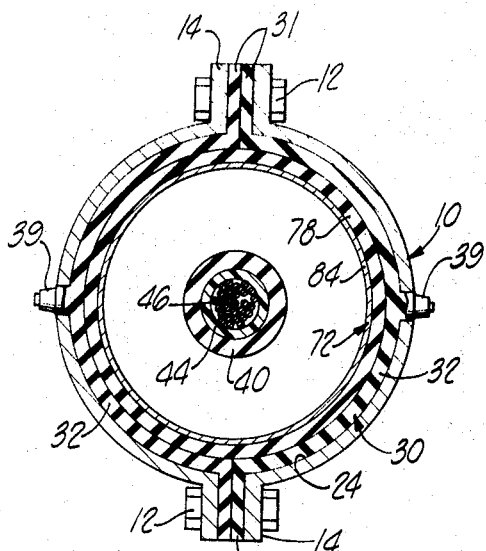
FIG. 3 is an end elevation taken along line 3—3 of FIG. 2 but having the other half of the case replaced.

Referring initially to FIG. 1, 2 and 3, the splice case 10 comprises a generally cylindrical housing comprised of two mating halves of generally semi-cylindrical shape which are removably secured together by any convenient means such as a plurality of nut and bolt fasteners 12 extending through the juxtaposed flanges 14. The case 10 provides an inner splice housing area 16 and at each end are openings adapted to permit the entry of the cable 18 therein and further adapted to receive the sealing and anchoring elements which constitute some of the novel features of this invention.

In the cable entry ends of the case 10 the case is formed providing two annular shoulders, the first shoulder 20 is located at the very edge of the opening 19 and the second shoulder 22 is located farther within the interior of the case as can be seen in FIG. 2. Between the shoulders 20 and 22 there is located an annular groove 24 having an inside diameter somewhat greater than the inside diameter of the shoulders 20 and 22. Each of the shoulders 20 and 22 is further provided with thin raised annular embossments 26 and 28 respectively having even less inside diameter than the shoulders.

Figure 5:
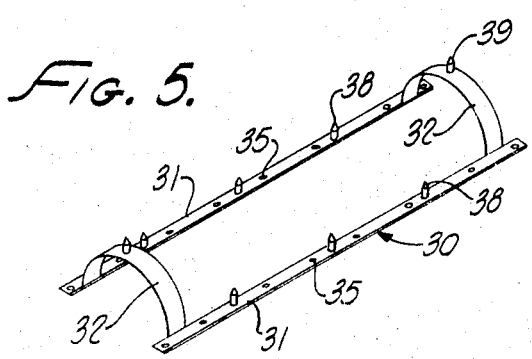
FIG. 5 is a perspective view of the gasket used on the one in — one out cases.

The mating surfaces of the flanges 14 are provided with sealing members therebetween such as the rubber sealing element 30 shown separately in FIG. 5. Sealing member 30 consists of two flat longitudinal members 31 adapted to directly engage the flanges 14, and arcuate members 32 adapted to reside in the annular grooves 24. Flanges 14 are provided with apertures 34 to receive the nut and bolt fasteners 12 and likewise, sealing member 30 is provided with apertures 35 adapted to be aligned with apertures 34. In addition to apertures 34 in the flanges 14 which receive the nut and bolt fastening elements, flanges 14 are further provided with additional apertures 36 positioned to receive therein upstanding protuberances 38 provided on the sealing member 30. The arcuate members 32 are likewise provided with upstanding protuberances 39 which extend through similar apertures provided in the annular recess 24. In FIGS. 1 and 3, these protuberances 39 and 38 can be seen extending through the case. The purpose of the protuberances should be readily apparent. When the case is ready to be assembled, a sealing member 38 is applied to the mating surfaces of each half of the case. The protuberances are pushed through the apertures 36 so that the sealing member 38 is held in place and aligned on the mating surfaces of each case half. In this manner, the technician need not worry about proper alignment of the sealing member since the protuberances will hold it in proper position until the case is finally assembled.

A single sheath conductor 18 consists of an outer layer of insulating material 40, a metal sheath 42 and sometimes a second insulating layer 44 immediately surrounding the plurality of individual conductors 46. The sheath 42 serves not only as an electrical shield and ground but also as an armor covering to protect the conductors 46. As such, sheath 42 is provided with a serrated surface to provide a more rigid structure. Conductor 18 is anchored in the case by the gripper 48. Gripper 48 comprises a cylindrical housing having an entrance aperture 50 and an exit aperture 52. The size of these apertures may be varied according to the exterior diameter of the insulating layer 40 and the sheath 42. The ends 51 and 53 of the gripper 48 are provided with concentric circular serrations 54 which permit larger or smaller apertures to be formed in the gripper as required.

The exterior of the gripper 48 is provided with an annular groove 56 near end 51 which is adapted to mate with the raised embossment 28 in the case thereby to prevent axial movement of the gripper in the case. The gripper is made in two mating halves. Two additional apertures 58 and 59 are provided for the exit of the grounding wire 60 which is mechanically and electrically secured to tab 62, which is an unwound end of the sheath 42. Ground wire 60 then is electrically connected to a stud 64 to which is attached a ground bus 66. Ground bus 66 will extend to a similar lug (not shown) to which the sheath of the other end of the next cable will be connected in a similar manner. The other aperture 58 is provided for the injection of a suitable molding compound.

After the ground wire 60 is attached to the sheath 42, the two halves of the gripper 48 are fitted together and then epoxy material 68 is injected into the interior of gripper 48 through aperture 58 completely filling the same. This then completes anchoring of the gripper 48 to the cable end and when the gripper is then fitted into place on the embossment 28, the cable is held against axial movement out of the case.

Prior to the attachment of the gripper 48 to the cable, sealing members 70 and 72 are slid into place on the cable 18. Sealing member 70 comprises a flat toroidal resilient member having a major center aperture 74 substantially conforming to the exterior diameter of the insulating material 40. Extending inwardly from the inner surface of the aperture 74 is an annular flange 76 of diminished thickness further extending toward the central axis of member 70. In position, this flange 76 will appear somewhat as shown in FIG. 2 providing a further sealing means surrounding the surface of the insulating jacket 40.

Sealing member 72 comprises a cylindrical resilient member 78 having an outer surface 80 provided with several raised serrations 82. Member 72 is inserted in the annular groove 24 between shoulders 20 and 22, and surface 80 engages the curved portion 32 of gasket 30. A circular ring element 84 is fitted inside portion 78 to retain it in its outward position whereby surface 80 will be in pressure sealing relationship with the inner surface of portion 32 of gasket 30. Pressure sealing member 72 is further provided with an axial boot or sealing extension 86 near the center thereof and attached to the end wall 88. Sealing boot 86 is provided with a serrated inner surface 90. A disc 92 of hard material such as metal is interposed between sealing members 70 and 72 and the outer diameter of disc 92 is substantially the same as that of member 72. The upper or outer edges of disc 92 thus contact the edge shoulder 20 further providing rigidity for sealing elements 70 and 72.

Thus it will be seen that the above-described structure will be effective in anchoring the end of the cable inside the case and will not permit tension loads applied to the cable to damage connections made to the conductors 46. If it is desired to pressurize the interior of the case, it will be seen that pressure member 72 will be extremely effective in maintaining pressure inside the case. Pressure bearing against member 72 will force wall section 88 outwardly to increase the sealing relationship with member 70. In addition, wall section 78 will be forced axially outwardly increasing the sealing pressure on surface 80 and boot 86 will be forced downwardly around the outer surface of the cable 18. Further, any pressure permitted to leak past any portion of member 72 will be further sealed by member 70 and portion 76 thereof. It will also be noted, that this sealing and anchoring assembly uses parts which are all very light in weight and which are impervious to moisture and the like. Thus, this cable splice case can be readily used both in direct buried installations or above ground on aerial poles.

Figure 4:
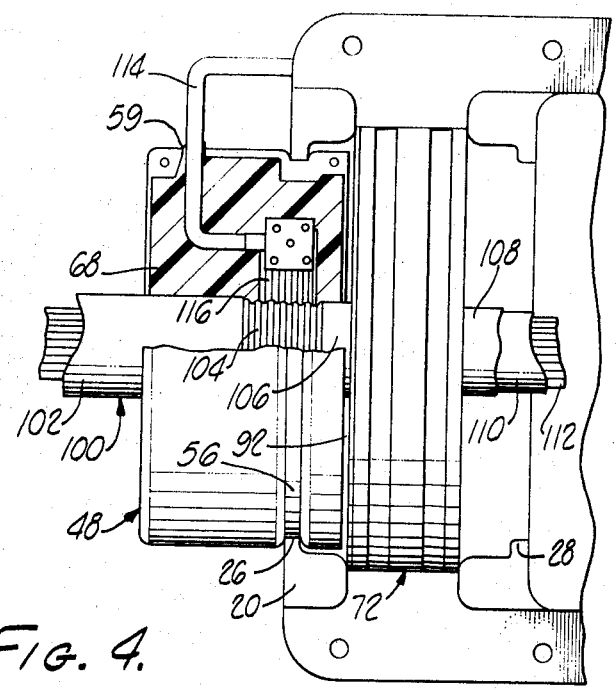
FIG. 4 is a partial sectional elevation of the splice case assembly as used with double sheath cables.

Turning now to FIG. 4, there is shown therein the configuration of the assembly for use with a double sheath cable. In this instance, the double sheath cable 100 consists of an outer covering of insulation 102, a first sheath 104, a second insulating layer 106 covering a second sheath 108 which may then surround a thin insulating sheath 110 inside of which reside the multiple conductors 112. Again, it is desired to apply the gripper 48 to the outer sheath 104 which has the serrated surface as shown. To accomplish this, the orientation of gripper 48 is reversed so that the annular groove 56 resides in the raised annular embossment 26 at the entrance to the case. Ground wire 114 is again mechanically and electrically secured to a tab portion 116 and extended from the interior of the gripper 48 through aperture 59 to be electrically connected through a bus bar (not shown) connected to the outer sheath of the other cable end. Likewise, the interior of gripper 48 is later filled with epoxy material 68. The configuration and use of sealing member 72 is substantially the same as it was when used in a single sheath cable in FIG. 2. In fact, the unique design of the elements of this invention permits a good deal of interchangeability of parts so that the gripper 48 and the sealing member 72 may be used but since the space previously occupied by end sealing member 70 is now occupied by the gripper, sealing member 70 is not used in this particular case.

Figure 6:
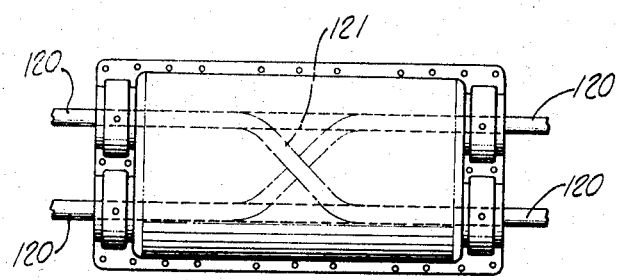
FIG. 6 is a plan view of a double splice case having a two in — two out configuration and FIG. 7 is a similar view of a double case having a two in — one out configuration.
Figure 7:
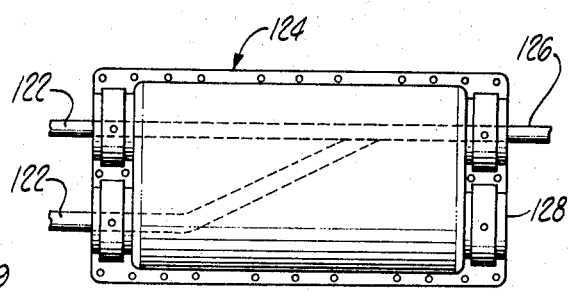

FIGS. 6 and 7 show the utility of the features of this invention for the connection of more than two cable ends. The same gripping and sealing members are used depending upon whether the conductors are single or double sheathed as previously described. The gasket pieces will be similar to gasket 30 of FIG. 5 except that additional arcuate elements 32 will be utilized as would be obvious. In FIG. 6, there is shown the entry of two cables 120 at each end with the possibility of cross connections 121 being made therebetween. In FIG. 7, there is shown two cables 122 entering on the left-hand side of the case 124 with a single cable 126 coming out. In such instances, two cables may be spliced into one, in which case, it will be necessary to seal off the unused aperture 128. This is accomplished by the use of a sealing member similar to member 72 except that wall section 88 thereof is solid.

It will thus be seen that the invention provides an improved and simplified means for splicing utility cables together so that the splice is protected from the elements as well as from any loads which might injure the splice. In addition, the present invention provides simplified elements therein so that the splice case can accommodate various types of cables and is of such light weight and simple construction that it can be used both in aerial applications as well as in direct buried ones. It will be obvious that the concept of the invention can be enlarged to afford the splicing of more than two cables as previously mentioned, and it is a further advantage that the case can be opened and closed a number of times without doing damage to the sealing elements therein.

I claim:

1. A cable splice case for connecting at least one electrical cable to at least one other electrical cable where such cables are of the type that have a bundle of insulated conductors surrounded by at least one metallic sheath covered by an outer insulating jacket, the combination comprising:

a casing comprised of a pair of mating halves, means sealably connecting said mating halves, a plurality of apertures in said casing located between said mating halves with part of each of said apertures formed in one said half and the remainder of the aperture formed in the other half, each aperture including an annular groove formed in said mating halves and annular projections on each side of said groove;

gripper means adapted to receive a cable end therein, each said gripper means comprising a cylindrical housing formed of a pair of mating halves, inlet and outlet apertures located at opposite ends of said housing, said apertures being aligned with the principal axis of said housing, means provided in said housing ends for selectively enlarging the diameter of one or both of said apertures to accommodate cables of varying sizes, said housing being capable of containing a quantity of thermosetting molding compound for retaining a cable end therein, said cylindrical gripper housing including means engaging one of said annular projections formed in the mating halves of the aforesaid casing and sealing means cooperatively engaging said apertures in said casing and adapted to engage an outer surface of a cable for sealably closing each said aperture.

2. A cable splice case as set forth in claim 1 wherein said gripper means further includes:

a third aperture disposed in a radial peripheral surface thereof and adapted to pass an electrically conducting ground lead so as to be connected to said sheath, and a fourth aperture in said housing for injecting said molding compound.

3. A cable splice case of the type set forth in claim 2 wherein said gripper housing further includes
an annular groove formed in the outer radial periphery thereof, said groove being located closer to one end of said housing then the other, said annular groove being engaging one of said annular projections in said casing to anchor the gripper means with respect thereto.

4. A cable splice case of the type set forth in claim 3 wherein said sealing means comprises:
a resilient sealing member positioned in said apertures to said casing and having a substantially cylindrical outer sealing portion, a planar end piece formed integrally with said outer portion and located at one end thereof, an aperture in said planar end piece, said apertures being coaxial with said outer portion, a sealing boot formed integrally with said end piece, said boot having a substantially cylindrical wall positioned about and coaxial with said aperture in said end piece the inner surface of said cylindrical wall of said boot being serrated, said inner surface being adapted to sealably engage an outer surface of said cable.

5. A cable splice case of the type set forth in claim 4 wherein said sealing means further includes:
a rigid cylindrical member positioned within the outer cylindrical sealing portion of said sealing member, said rigid member biasing said sealing portion outwardly;
a rigid disc element positioned adjacent the exterior of said end piece, the radial dimensions of said disc being substantially coterminous with that of said end piece, said disc having a central aperture aligned with the aperture in said end piece.

6. A cable splice case of the type set forth in claim 1 wherein said sealing means comprises:
a resilient sealing member positioned in said apertures to said casing and having a substantially cylindrical outer sealing portion, a planar end piece formed integrally with said outer portion and located at one end thereof, an aperture in said planar end piece, said aperture in said end piece being coaxial with said outer portion, a sealing boot formed integrally with said end piece, said boot having a substantially cylindrical wall positioned about and coaxial with said aperture, the inner surface of said cylindrical wall of said boot being serrated, said inner surface being adapted to sealably engage an outer surface of said cable.

7. A cable splice case of the type set forth in claim 6 wherein said sealing means further includes:
a rigid cylindrical member positioned within the outer cylindrical sealing portion of said sealing member, said rigid member biasing said sealing portion outwardly;
a rigid disc element positioned adjacent the exterior of said end piece, the radial dimensions of said disc being substantially coterminous with that of said end piece, said disc having a central aperture aligned with the aperture in said end piece.

8. A cable splice case of the type set forth in claim 7, wherein said sealing means further includes:
flat toroidal sealing members composed of resilient material, said toroidal members being positioned in said casing apertures adjacent said rigid disc element, the central aperture of said toroidal member being aligned with the aperture in said disc, the aperture of said toroidal member being provided with a radially disposed annular flange, said flange adapted to sealably engage an outer surface of said cable.

* * * * *